Figure 1:
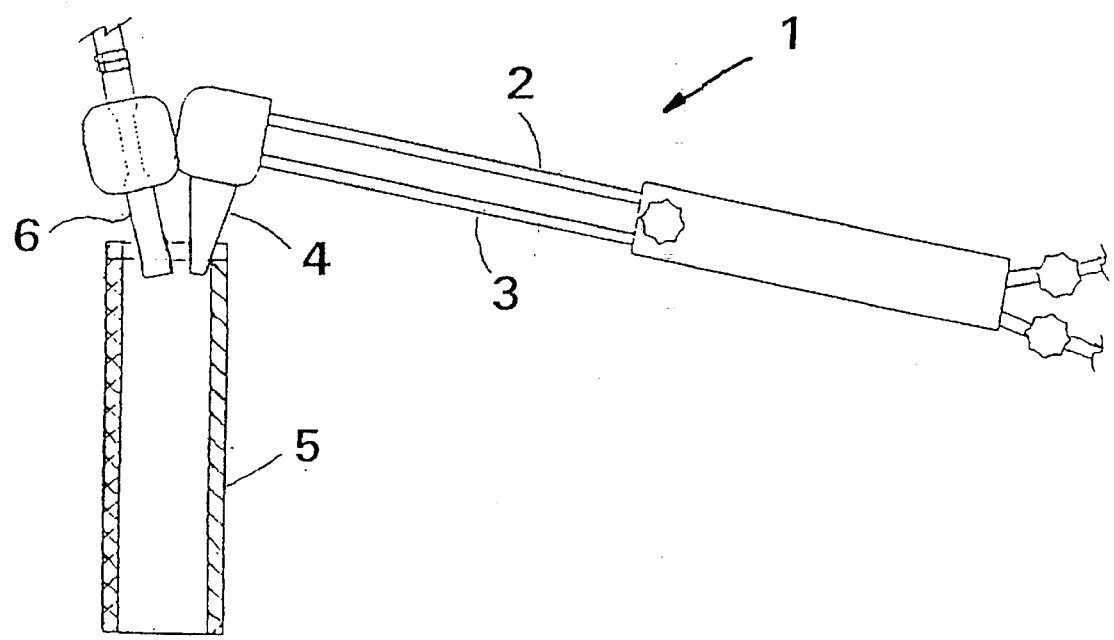

United States Patent [19]
Burkes et al.

[11] Patent Number: 5,624,492
[45] Date of Patent: Apr. 29, 1997

[54] HEAT TREATMENT IN THE CONTROL OF THE SETTING OF CEMENT

[75] Inventors: Jerry P. Burkes; Clifford E. Grey, Jr.; Philip G. Malone; Toy S. Poole, all of Vicksburg; Charles A. Weiss, Jr., Clinton, all of Miss.

[73] Assignee: The United States of America as represented by the Secretary of the Army, Washington, D.C.

[21] Appl. No.: 518,349

[22] Filed: Aug. 23, 1995

[51] Int. Cl.⁶ .................................................. C04B 7/43
[52] U.S. Cl. ..................... 106/723; 106/746; 106/748; 106/749; 106/750; 264/5; 264/12; 264/15
[58] Field of Search ................... 106/739, 746, 106/748, 749, 750, 716, 723, 742, 740, 713; 264/DIG. 43, 5, 7, 12, 15

[56] References Cited

U.S. PATENT DOCUMENTS

| | | | |
|---|---|---|---|
| Re. 21,633 | 11/1940 | Kaiser | 106/750 |
| 3,003,757 | 10/1961 | Mitchell | 106/750 |
| 3,066,031 | 11/1962 | Schifferle | 106/739 |
| 4,213,791 | 7/1980 | Wilson | 106/100 |
| 4,249,952 | 2/1981 | Davis et al. | 106/103 |
| 4,289,537 | 9/1981 | Davis et al. | 106/100 |
| 4,333,766 | 6/1982 | Moisset et al. | 106/100 |
| 4,388,117 | 6/1983 | Wilson | 106/100 |
| 4,477,283 | 10/1984 | Wilson | 106/100 |

*Primary Examiner*—Paul Marcantoni
*Attorney, Agent, or Firm*—Luther A. Marsh

[57] ABSTRACT

Portland cement particles having the characteristics of slow hardening is produced by a process of heat treating portland cement particles in the temperature range from 1500° to 3000° C. for from 0.5 to 10 seconds and cooling to obtain particles containing an amorphous, glassy shell as an outside layer.

12 Claims, 1 Drawing Sheet

HEAT TREATMENT IN THE CONTROL OF THE SETTING OF CEMENT

GOVERNMENT INTEREST STATEMENT

The invention described herein may be manufactured, licensed, and used by or for governmental purposes without the payment of any royalties thereon.

I. BACKGROUND OF THE INVENTION

1. Field of Invention

This invention relates to a method of retarding the hydration of cement. Specifically, it relates to a method of heat treating cement to retard its rate of hydration after mixing with coarse and fine aggregate and water to form concrete.

2. Prior Art

The chemical reactions taking place during the hydration of cement, such as portland cement, are exothermic, i.e. they evolve heat. These chemical reactions include the hydration of calcium silicates and calcium aluminates. When large masses of concrete are in the process of hardening, or curing, or during hot weather, the temperature of the concrete may rise appreciably, further accelerating the rate of chemical reaction, or curing, in the concrete and accelerating the rate of heat evolution. This heat evolution may raise the temperature of the concrete to the boiling point of water, vaporizing a portion of the water in the mixture, disrupting the concrete, and producing an unacceptable concrete.

It is important, therefore, to provide methods of controlling the rate of hydration, and thus the rate of heat evolution, during the curing of cement. Conventionally, this is accomplished by the addition of chemical retarders to the cement, aggregate and water mixture.

Chemical retarders currently in use include calcium, sodium, or ammonium lignosulfonates; organic acids including adipic, citric, and tartaric acids or their sodium salts; carbohydrates and their derivatives such as sugars, starch, and sodium gluconate; and inorganic phosphate and borate salts. Such chemical retarders are typically added in small proportions, e.g. 0.2–0.5 percent by weight based on cement. Small variations in the dosage of retarders from the norm can produce disastrous effects, such as cement that will not hydrate and cure. Chemical retarders, even when used exactly in the prescribed dosages, can interact chemically with other additives used for improving the pumpability of the concrete, producing unexpected side effects, such as an acceleration of the hardening process rather than a slowing down of this process, or conversely, concrete mixtures that will not harden at all.

Some retarders are toxic and potentially carcinogenic and therefore pose a health and safety risk during use. Retarder formulations containing formaldehyde pose a particular health risk.

There is a need, therefore, for an improved method of retarding the rate of hydration of cement. This is accomplished in the method of this invention by subjecting the cement briefly to a high temperature treatment.

High-temperature processes in the manufacture of cements, such as portland cement are known to the art. U.S. Pat. Nos. 4,213,791, 4,249,952, 4,289,537, and 4,388,117 disclose processes in which the ingredient mixtures for making the cerment, generally limestone, sources of silica, and-optionally, sources of alumina and ferric oxide, are heated above the fusion temperature (>1500° C.) of such materials in electric arc furnaces, whereby pools of molten material are produced having the desired chemical compositions. Molten material from these pools is intermittently or continuously tapped and allowed to cool and solidify. Ingredients for making the cement are added to the furnaces continuously or intermittently. U.S. Pat. Nos. 4,333,766 and 4,477,283 disclose processes in which plasma arc torches are used to raise the temperature of the cement ingredients above their melting points. There is no indication in any of these prior-art high-temperature treatment processes that cement having a slow rate of hydration during curing is being produced.

II. SUMMARY OF THE INVENTION

A method has now been discovered for slowing down the chemical reactions occurring during the hardening of cement. The term "hardening" is used herein to denote the processes commonly referred to as setting and curing during which cement-water paste solidifies and gains compressive strength as calcium silicates and aluminates hydrate.

In the method of this invention, the cement mixture, specifically portland cement, consisting of calcium silicates and aluminates, produced by conventional means by heating sources of lime, silica, and alumina such as limestone, sand, shale, and clay, in shaft or rotary furnaces to about 1450° C. and subsequent cooling and grinding, is subjected to a further brief heat treatment at approximately 1500°–3000° C. and allowed to cool. The product of this additional heat treatment may then, optionally, be ground to a finer particle size. The product of this treatment, when mixed with aggregate and water, displays the quality of retarded hydration and therefore takes an appreciably longer time to harden, i.e. hydrate, than cement that has not been treated by the methof of this invention. The quality of retarded hydration is herein referred to as slow hardening.

The effect of the heat treatment in accordance with this invention on the rate of hydration and on the time-to-harden is explained by the increased amount of amorphous, glassy material in the predominantly crystalline product of heat treatment. The mixture of calcium silicates and aluminates produced by conventional kiln treatment at approximately 1450° C. and cooling consists mostly of crystalline material mixed with some glassy, amorphous material constituting from 2 to about 21 percent by weight of the total. This intermediate product, called clinker, is ground to produce conventional cement.

When this conventional cement is reheated to a higher temperature by suspending the cement particles in a hot gas in the temperature range from 1500° to 3000° C. for an interval of time ranging from about 0.5 seconds to about 10 seconds and cooled in the gas stream, in accordance with the process of this invention, additional amorphous, glassy material is formed as a shell on the outside of the cement particles, and the corners and edges of the original cement particles are seen under the microscope to have been rounded. This material when mixed with aggregate and water, has a time-to-harden about seven times as long as that of untreated cement. When the material is reground to a fine particle size (about 95% smaller than 45 microns), the time-to-harden is reduced to about five times that of untreated cement.

Equipment for carrying out the high-temperature treatment of this invention includes rotary kilns, shaft furnaces, fluidized bed reactors, entrained bed reactors, and plasma arcs. The attainment of the high temperatures used in the method of This invention may require special process conditions. Combustion air and fuel for firing the equipment may require preheating. Oxygen enrichment of the combustion air, or the use of virtually pure oxygen, may be required. Fuels such as natural gas, liquefied petroleum gas, naphtha, kerosene, No. 2 fuel oil, and high-energy fuels such as acetylenic and diolefinic hydrocarbons, such as acetylene, methylacetylene, or propadiene, may be used.

III. BRIEF DESCRIPTION OF THE DRAWING

FIG. 1 is a schematic illustration of one embodiment of the present invention.

IV. DETAILED DESCRIPTION OF THE INVENTION

With reference to FIG. 1, there is shown an oxygen-acetylene torch 1 having oxygen and acetylene supply tubes 2 and 3, and a burner tip 4. This burner tip is directed into a metal tube 5. Also directed into this tube is a nozzle 6 for conveying finely-divided portland cement suspended in a stream of air.

In operation, the acetylene supply is activated, the acetylene is ignited, and the oxygen supply is activated to produce a flame having a peak flame temperature of about 3000° C. A mixture of finely divided portland cement and convection air is now introduced via nozzle 6. The hot combustion gases from the oxygen-acetylene flame mix with the air and portland cement particles, raising the latter to a temperature at which the particle surfaces partially fuse. The mixture of gases and particles flows through the tube 5 and the hot particles are dumped into a receiving hopper (not illustrated), in which the particles are allowed to cool to room temperature.

Observations of the time-to-harden were made on 4-gram samples each of untreated portland cement and portland cement treated by the method of this invention. Each sample was mixed with 1.6 ml of water and maintained at 23° C. in a capped plastic vial. The samples were judged to have hardened when the surface of the samples could not be penetrated with a steel needle probe weighing 2.5 grams. The untreated sample hardened after seven hours. The sample of portland cement treated by the method of this invention hardened after 48 hours.

While only a single embodiment of the invention has been illustrated and described, it is not intended to be limited thereby but only by the scope of the appended claims.

What is claimed is:

1. A process for producing slow-hardening Portland cement comprising heating Portland cement particles to a temperature from about 1500° C. to about 3000° C. from about 0.5 seconds to about 10 seconds, and cooling the particles, said process resulting in the formation of an amorphous, glassy shell on the outside of the cement particles.

2. The process of claim 1 wherein the heating is accomplished by injecting the the Portland cement particles into a combustion zone wherein a hydrocarbon fuel is burned with a gas selected from the group consisting of air, oxygen-enriched air, and pure oxygen.

3. The process of claim 2 wherein the fuel is selected from the group consisting of natural gas, liquefied petroleum gas, naphtha, kerosene, fuel oil, acetylene, methylacetylene, propadiene, and mixtures thereof.

4. The process of claim 2 wherein the Portland cement particles are suspended in air and injected into the combustion zone.

5. The process of claim 1 wherein the heating is accomplished by injecting the Portland cement particles into a electric plasma arc.

6. In a process for preparing cement wherein sources of lime, silica, and alumina are mixed, heated to about 1450° C., cooled, and ground to fine particle size, the improvement comprising reheating the ground cement to 1500° C. to about 3000° C. from about 0.5 seconds to about 10 seconds, and cooling the heated cement, whereby a slow-hardening cement is produced having particles containing an amorphous, glassy shell as an outside layer.

7. The process of claim 6 wherein the reheating is accomplished by injecting the Portland cement particles into a combustion zone wherein a hydrocarbon fuel is burned with a gas selected from the group consisting of air, oxygen-enriched air, and oxygen.

8. The process of claim 7 wherein the fuel is selected from the group consisting of natural gas, liquefied petroleum gas, naphtha, kerosene, fuel oil, acetylene, methylacetylene, propadiene, and mixtures thereof.

9. The process of claim 6 wherein the Portland cement particles are suspended in air and injected into the combustion zone.

10. The process of claim 6 wherein the reheating is accomplished by injecting the Portland cement particles into a electric plasma arc.

11. A slow-hardening Portland cement produced by the process of claim 1.

12. A slow-hardening Portland cement composition produced by the process of claim 6.

* * * * *